(12) United States Patent
Suzuki et al.

(10) Patent No.: US 8,306,702 B2
(45) Date of Patent: Nov. 6, 2012

(54) ELECTRIC POWER STEERING APPARATUS

(75) Inventors: Hiroshi Suzuki, Okazaki (JP); Terutaka Tamaizumi, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 738 days.

(21) Appl. No.: 11/970,114

(22) Filed: Jan. 7, 2008

(65) Prior Publication Data

US 2008/0167780 A1 Jul. 10, 2008

(30) Foreign Application Priority Data

Jan. 9, 2007 (JP) ................................ 2007-001177

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2006.01) |

(52) U.S. Cl. ............ 701/42; 701/41; 180/400; 180/443; 180/446

(58) Field of Classification Search .................... 701/41, 701/42, 79; 180/400, 443, 446; 280/5.51
See application file for complete search history.

(56) References Cited

U.S. PATENT DOCUMENTS

| | | | | |
|---|---|---|---|---|
| 4,664,211 A | * | 5/1987 | Oshita et al. ................... | 180/446 |
| 4,834,203 A | * | 5/1989 | Takahashi et al. ............ | 180/446 |
| 5,201,818 A | * | 4/1993 | Nishimoto ..................... | 180/446 |
| 6,082,482 A | | 7/2000 | Kato et al. | |
| 6,527,079 B2 | * | 3/2003 | Takeuchi et al. .............. | 180/443 |
| 6,570,352 B2 | * | 5/2003 | Hara et al. ..................... | 318/432 |
| 6,768,283 B2 | * | 7/2004 | Tanaka et al. ................. | 318/632 |
| 6,854,559 B2 | * | 2/2005 | Kurishige et al. ............. | 180/446 |
| 6,854,560 B2 | * | 2/2005 | Nishiyama et al. ........... | 180/446 |
| 2001/0017229 A1 | * | 8/2001 | Kada et al. ..................... | 180/446 |
| 2003/0217885 A1 | * | 11/2003 | Aoki et al. ..................... | 180/446 |
| 2005/0049769 A1 | * | 3/2005 | Tsuchiya ........................ | 701/41 |

(Continued)

FOREIGN PATENT DOCUMENTS

DE    10 2005 011 379 A1    10/2005

(Continued)

OTHER PUBLICATIONS

U.S. Appl. No. 12/435,046, filed May 4, 2009, Tamaizumi, et al.

(Continued)

*Primary Examiner* — Thomas Tarcza
*Assistant Examiner* — Rami Khatib
(74) *Attorney, Agent, or Firm* — Oblon, Spivak, McClelland, Maier & Neustadt, L.L.P.

(57) ABSTRACT

A steering wheel return compensation component is calculated based on an integrated value obtained by integrating a basic control amount in such a manner that the basic control amount has a property to rotate a steering wheel with a specific steering angle by a greater amount to its neutral position as the absolute value of the steering angle becomes greater. Alternatively, a steering wheel return compensation component is calculated in such a manner that the steering wheel return compensation component has a property to rotate the steering wheel by a greater amount to the neutral position as the absolute value of an integrated value obtained by integrating the steering angle becomes greater.

15 Claims, 11 Drawing Sheets

U.S. PATENT DOCUMENTS

| | | | |
|---|---|---|---|
| 2005/0109556 A1* | 5/2005 | Kubota et al. | 180/446 |
| 2005/0121252 A1* | 6/2005 | Tsuchiya | 180/446 |
| 2009/0157261 A1* | 6/2009 | Yamazaki | 701/42 |

FOREIGN PATENT DOCUMENTS

| | | |
|---|---|---|
| EP | 1 036 727 A1 | 9/2000 |
| EP | 1 538 065 A2 | 6/2005 |
| FR | 2 835 232 | 8/2003 |
| JP | 10-230861 | 9/1998 |
| JP | 2002-145100 | 5/2002 |
| JP | 2002-145101 | 5/2002 |
| JP | 2005-162105 | 6/2005 |
| JP | 2007106219 A * | 4/2007 |

OTHER PUBLICATIONS

U.S. Appl. No. 12/260,472, filed Oct. 29, 2008, Tamaizumi, et al.
U.S. Appl. No. 12/273,881, filed Nov. 19, 2008, Tamaizumi.
U.S. Appl. No. 12/354,401, filed Jan. 15, 2009, Nozawa.
U.S. Appl. No. 12/355,118, filed Jan. 16, 2009, Nozawa, et al.

* cited by examiner

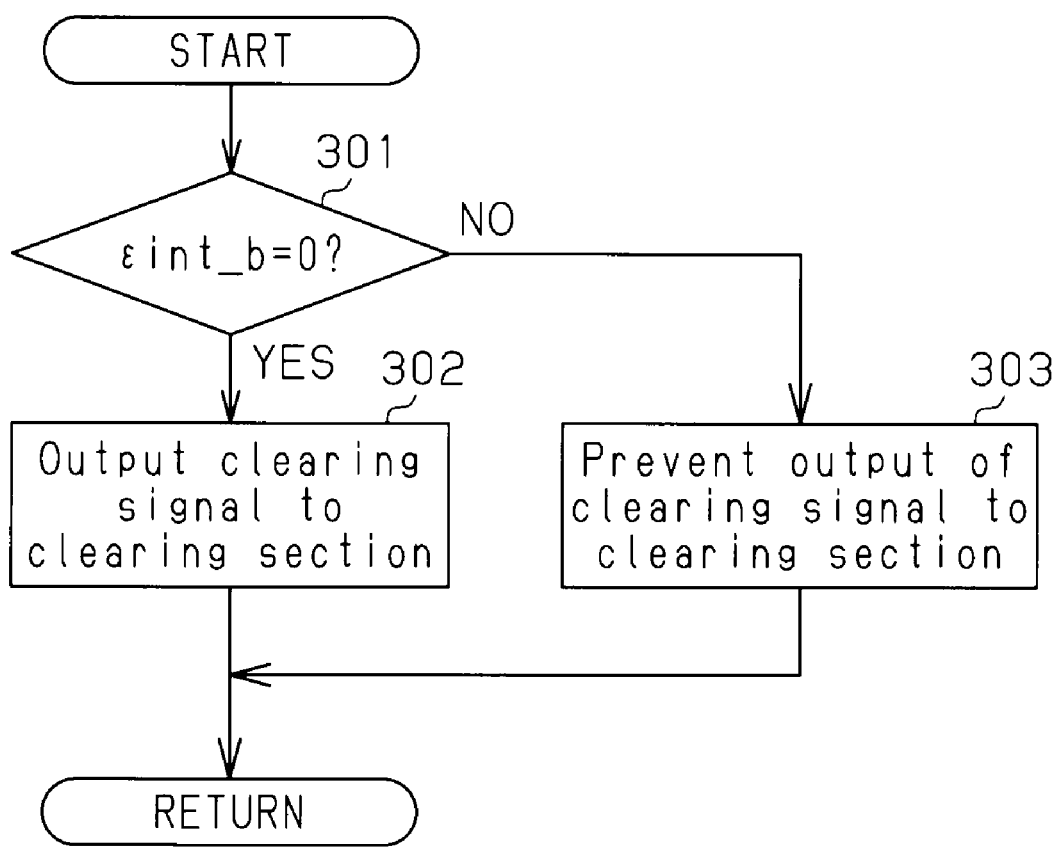

ELECTRIC POWER STEERING APPARATUS

CROSS-REFERENCE TO RELATED APPLICATIONS

This application is based on and claims priority from Japanese Patent Application No. 2007-001177 filed on Jan. 9, 2007, the entire contents of which are incorporated herein by reference.

BACKGROUND OF THE INVENTION

The present invention relates to an electric power steering apparatus.

An electric power steering apparatus (EPS) using a motor as a driving source is generally employed as a power steering apparatus of a vehicle. In many cases, the EPS performs steering wheel return compensation control as one of compensation controls so that a steering wheel is returned to a neutral position (see, for example, Japanese Laid-Open Patent Publication No. 2002-145101).

Theoretically, as long as the vehicle is moving, the steering wheel is returned to the neutral position (that is, the position at which the steering angle becomes zero) by the self aligning torque acting on the steered wheels, without operation of the steering wheel. However, if friction in the system of the EPS, which is, for example, a decelerating mechanism including a ball screw and a worm and a wheel, exceeds the self aligning torque acting on the steered wheels, the steering wheel cannot be fully returned to the neutral position. In this case, the steering wheel return compensation control is carried out so that the steering wheel is quickly returned to the neutral position. The control involves calculation of a steering wheel return compensation amount in accordance with which the steering wheel is rotated to restore its neutral position. The compensation amount is superimposed on a basic assist control amount, which is a basic component of power assist control.

However, the self aligning torque, which acts on the steered wheels, changes depending on the condition of the road surface. Thus, in the case of the conventional EPS, particularly if the vehicle is traveling on a low-µ road such as an icy road, the self aligning torque may decrease and thus hamper returning of the steering wheel. In other words, the conventional EPS is designed in correspondence with a general condition of a road surface on which the vehicle travels for a usual purpose of use, that is, for traveling on a high-µ road such as a paved road. Further, the steering wheel return compensation control is designed in correspondence with the self aligning torque produced by traveling on a high-µ road. Thus, when the vehicle travels on a low-µ road, the steering wheel return compensation amount may become insufficient. In this regard, the conventional EPS has yet to be improved.

SUMMARY OF THE INVENTION

Accordingly, it is an objective of the present invention to provide an electric power steering apparatus that ensures satisfactory returning performance of a steering wheel regardless of the condition of a road surface on which a vehicle travels.

To achieve the foregoing and other objectives and in accordance with one aspect of the present invention, an electric power steering apparatus of a vehicle is provided. The apparatus includes a steering force assisting section and a control section. The steering force assisting section applies an assisting force to a steering system of the vehicle to assist manipulation of a steering wheel. The steering force assisting section includes a motor as a driving source. The control section calculates a target value of the assisting force applied to the steering system. The control section calculates the target value by superimposing on a basic assist component a steering wheel return compensation component in accordance with which the steering wheel is returned to a neutral position. The control section controls operation of the steering force assisting section by supplying a driving power to the motor in such a manner that the assisting force matching the target value is applied to the steering system. The steering wheel return compensation component is calculated by the control section based on an integrated value obtained by integrating a basic control amount computed by the control section in such a manner that the basic control amount has a property to rotate the steering wheel with a specific steering angle by a greater amount to the neutral position as the absolute value of the steering angle becomes greater. Alternatively, the steering wheel return compensation component is calculated by the control section in such a manner that the steering wheel return compensation component has a property to rotate the steering wheel by a greater amount to the neutral position as the absolute value of an integrated value obtained by integrating the steering angle becomes greater.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 16 is a flowchart representing a clearing determining procedure performed by the EPS according to the third embodiment.

DETAILED DESCRIPTION OF THE PREFERRED EMBODIMENTS

First Embodiment

A first embodiment of the present invention will now be described with reference to FIGS. 1 to 9.

Figure 1:
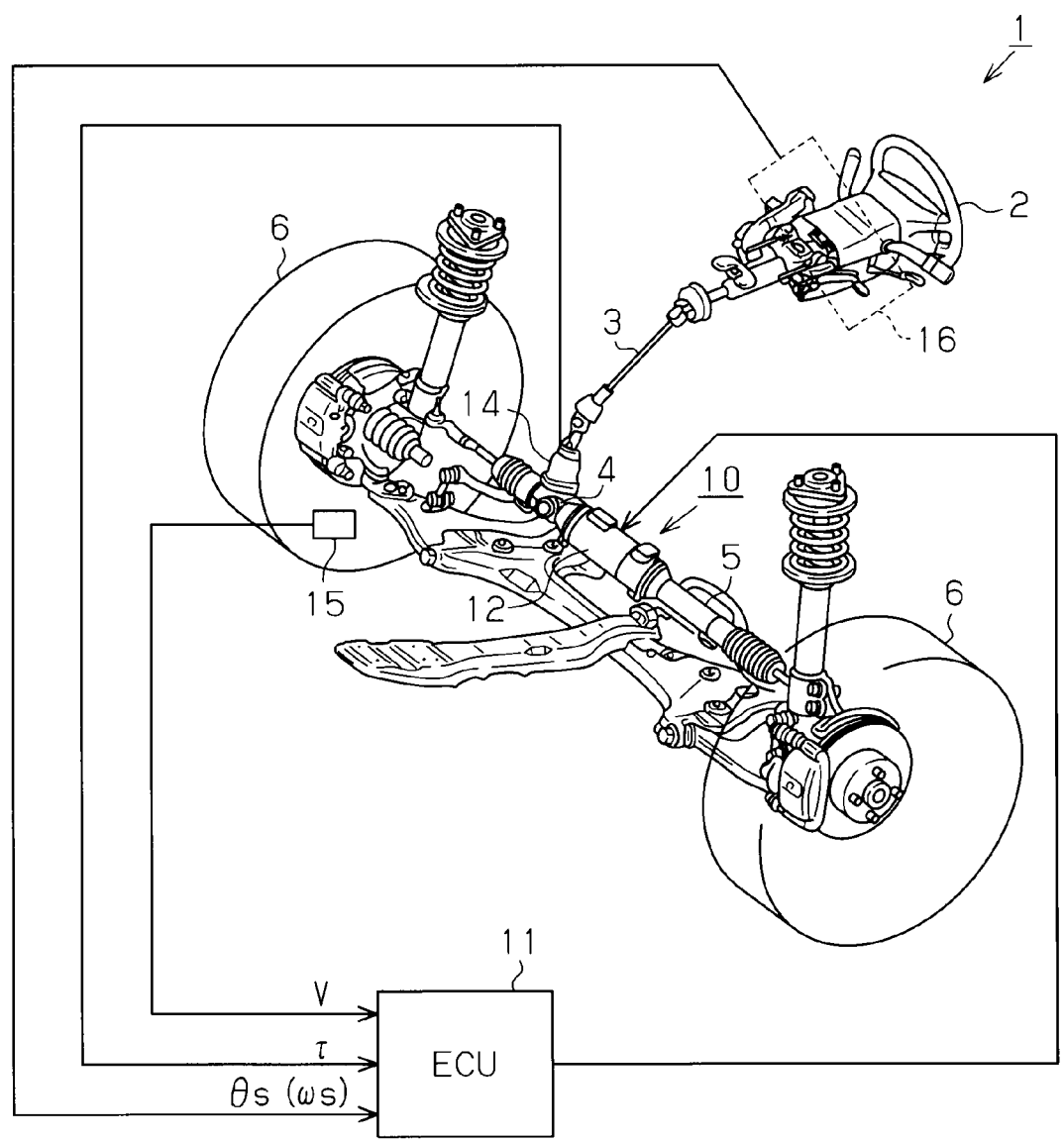
FIG. 1 is a schematic view showing an electric power steering apparatus (EPS) according to a first embodiment of the present invention.

As shown in FIG. 1, in a vehicle with an electric power steering apparatus (EPS) 1 according to the first embodiment, a steering shaft 3, which extends from a steering wheel 2, is connected to a rack 5 through a rack and pinion mechanism 4. Rotation of the steering shaft 3, which is caused by manipulation of the steering wheel 2, is converted into linear reciprocation of the rack 5 through the rack and pinion mechanism 4. The steered angle of steered wheels 6 is changed in correspondence with the linear reciprocation of the rack 5, so that the traveling direction of the vehicle shifts.

The EPS 1 includes an EPS actuator 10 and an ECU 11. The EPS actuator 10 serves as a steering force assisting section, which applies assisting force to a steering system of the vehicle so that the manipulation of the steering wheel 2 is assisted. The ECU 11 serves as control means (a control section) that controls operation of the EPS actuator 10.

The EPS actuator 10 is a rack assist type EPS actuator with a motor 12, which functions as the driving source of the EPS actuator 10, arranged coaxially with the rack 5. The motor torque produced by the motor 12 is transmitted to the rack 5 through a non-illustrated ball screw mechanism. The motor 12 is a brushless motor and rotates as powered by three-phase (U, V, W) driving power supplied from the ECU 11.

A torque sensor 14, a vehicle speed sensor 15, and a steering angle sensor 16 are connected to the ECU 11. The torque sensor 14, the vehicle speed sensor 15, and the steering angle sensor 16 detect a steering torque $\tau$, a vehicle speed V, and a steering angle $\theta s$ (steering speed $\omega s$), respectively. In correspondence with these detection values, the ECU 11 calculates a target value of the assisting force produced by the EPS actuator 10, or applied to the steering system. The ECU 11 controls the operation of the EPS actuator 10 by supplying driving power to the motor 12 in such a manner that the assisting force matching the target value is applied to the steering system.

Assist control by the EPS 1 of the first embodiment will hereafter be explained.

Figure 2:
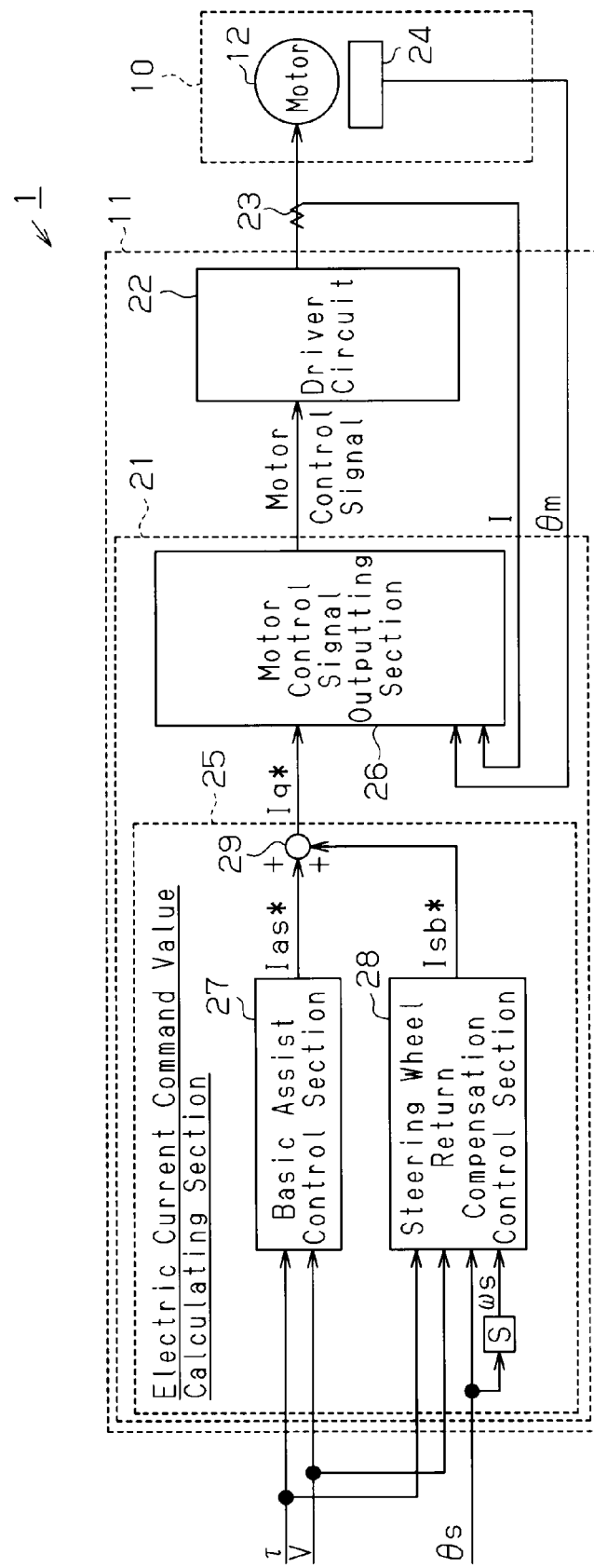
FIG. 2 is a block diagram representing control of the EPS according to the first embodiment.

As illustrated in FIG. 2, or the block diagram representing control of the EPS 1, the ECU 11 includes a microcomputer 21 outputting a motor control signal and a driver circuit 22 supplying the driving power to the motor 12 of the EPS actuator 10 in accordance with the motor control signal from the microcomputer 21.

An electric current sensor 23 and a rotation angle sensor 24 are connected to the ECU 11. The electric current sensor 23 detects an actual electric current value I, which is supplied to the motor 12. The rotation angle sensor 24 detects rotation angle $\theta m$ of the motor 12. The microcomputer 21 provides the motor control signal to the driver circuit 22 based on the actual electric current value I and the rotation angle $\theta m$, which are detected by the electric current sensor 23 and the rotation angle sensor 24, respectively, in addition to the aforementioned steering torque $\tau$ and vehicle speed V, which are condition amounts.

Control blocks, which will be explained in the following, are each carried out in accordance with a computer program executed by the microcomputer 21. The microcomputer 21 carries out a procedure of each of the control blocks while sampling the aforementioned condition amounts at predetermined cycles.

The microcomputer 21 includes an electric current command value calculating section 25 and a motor control signal outputting section 26. The electric current command value calculating section 25 calculates an electric current command value Iq* matching the target value of the assisting force applied to the steering system, or a target assisting force. The motor control signal outputting section 26 outputs the motor control signal in correspondence with the electric current command value Iq*, which is calculated by the electric current command value calculating section 25.

Specifically, the electric current command value calculating section 25 has a basic assist control section 27 and a steering wheel return compensation control section 28. The basic assist control section 27 calculates a basic assist control amount Ias*, which is a basic control component of the target assisting force. The steering wheel return compensation control section 28 calculates a steering wheel return compensation amount Isb* in accordance with which the steering wheel 2 is returned to the neutral position ($\theta s=0$), as a compensation component of the target assisting force.

The basic assist control section 27 calculates the basic assist control amount Ias* in correspondence with the steering torque $\tau$ and the vehicle speed V, which are detected by the torque sensor 14 and the vehicle speed sensor 15, respectively. As the detected steering torque $\tau$ becomes greater, or the detected vehicle speed V becomes smaller, the basic assist control amount Ias*, which is calculated by the basic assist control section 27, becomes greater. The steering wheel return compensation control section 28 calculates the steering wheel return compensation amount Isb* in correspondence with the steering angle $\theta s$ and the steering speed $\omega s$, which are detected by the steering angle sensor 16, in addition to the steering torque $\tau$ and the vehicle speed V, which are detected by the torque sensor 14 and the vehicle speed sensor 15, respectively.

The basic assist control amount Ias*, which is obtained by the basic assist control section 27, and the steering wheel return compensation amount Isb*, which is determined by the steering wheel return compensation control section 28, are input to an adder 29. The electric current command value calculating section 25 calculates the electric current command value Iq* matching the target assisting force by superimposing the steering wheel return compensation amount Isb* on the basic assist control amount Ias* at the adder 29. The electric current command value calculating section 25 then outputs the electric current command value Iq* to the motor control signal outputting section 26.

In addition to the electric current command value Iq*, which is output by the electric current command value calculating section 25, the motor control signal outputting section 26 receives the actual electric current value I detected by the electric current sensor 23 and the rotation angle θm detected by the rotation angle sensor 24. The motor control signal outputting section 26 calculates the motor control signal by performing feedback control in such a manner that the actual electric current value I follows the electric current command value Iq* matching the target assisting force.

In the feedback control of the electric current, phase current values (Iu, Iv, Iw) of the motor 12, which are detected as the actual electric current value I, are converted into d, q-axis electric current values of a d/q coordinate system (d/q conversion), based on the rotation angle θm detected by the rotation angle sensor 24. The electric current command value Iq* is input to the motor control signal outputting section 26 as a q-axis electric current command value. Based on the d, q-axis electric current values and the q-axis electric current command value, the motor control signal outputting section 26 calculates a d, q-axis voltage command values. The motor control signal outputting section 26 then calculates phase voltage command values (Vu*, Vv*, Vw*) through inverse d/q transformation of the d, q-axis voltage command values. The motor control signal outputting section 26 thus generates the motor control signal based on the phase voltage command values.

The motor control signal is then sent from the microcomputer 21 to the driver circuit 22. The driver circuit 22 provides the three-phase driving power to the motor 12 based on the motor control signal from the microcomputer 21. In this manner, the ECU 11 controls the operation of the EPS actuator 10.

In the following, the constitution of the steering wheel return compensation control section 28 and the steering wheel return compensation control performed by the steering wheel return compensation control section 28 will be explained.

Figure 3:
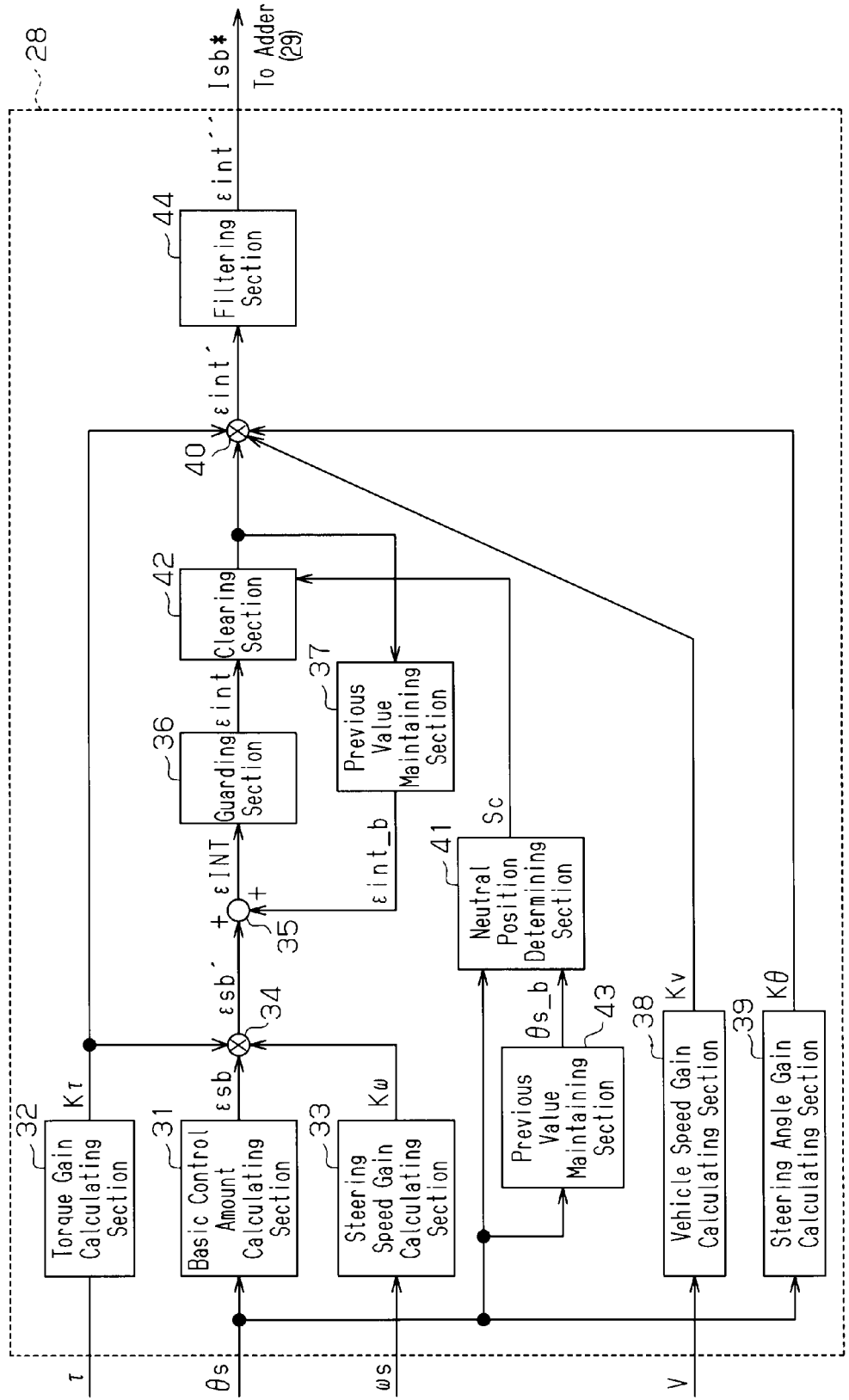
FIG. 3 is a block diagram representing control of a steering wheel return compensation control section of the EPS according to the first embodiment.
Figure 4:
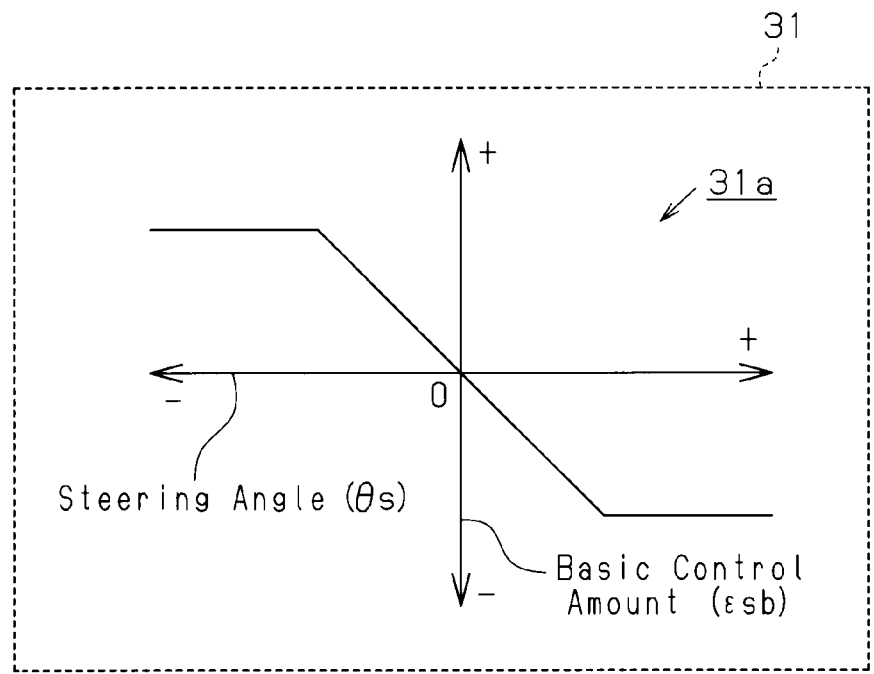
FIG. 4 is a diagram schematically representing a basic control amount calculating section of the EPS according to the first embodiment.

With reference to FIG. 3, the steering wheel return compensation control section 28 has a basic control amount calculating section 31, which calculates a basic control amount εsb, which is a basic component of the steering wheel return compensation amount Isb*. Specifically, the basic control amount calculating section 31 obtains the basic control amount εsb based on the steering angle θs detected by the steering angle sensor 16. More specifically, with reference to FIG. 4, the basic control amount calculating section 31 has a map 31a that associates the steering angle Gs with the basic control amount εsb. With reference to the map 31a, the basic control amount calculating section 31 calculates the basic control amount εsb corresponding to the steering angle θs detected by the steering angle sensor 16.

The basic control amount εsb obtained by the basic control amount calculating section 31 has a property to rotate the steering wheel 2 in a direction of a sign opposite to the direction of the sign of the steering angle θs, which is detected by the steering angle sensor 16. In other words, if the direction of the sign of the detected steering angle θs is positive, the basic control amount εsb has a property to rotate the steering wheel 2 in the negative direction. If the direction of the sign of the steering angle θs is negative, the basic control amount εsb has a property to rotate the steering wheel 2 in the positive direction. As the absolute value of the steering angle θs becomes greater, the absolute value of the basic control amount εsb, which is calculated by the basic control amount calculating section 31, becomes greater so that the steering wheel 2 is rotated toward the neutral position by a greater amount. In other words, the basic control amount calculating section 31 calculates the basic control amount εsb in such a manner that, in accordance with the basic control amount εsb, the amount of rotation of the steering wheel 2 to the neutral position becomes greater as the absolute value of the steering angle θs becomes greater.

The steering wheel return compensation control section 28 has a torque gain calculating section 32 and a steering speed gain calculating section 33. The torque gain calculating section 32 calculates a torque gain Kτ based on the steering torque τ. The steering speed gain calculating section 33 obtains a steering speed gain Kω based on the steering speed ωs.

Figure 5:
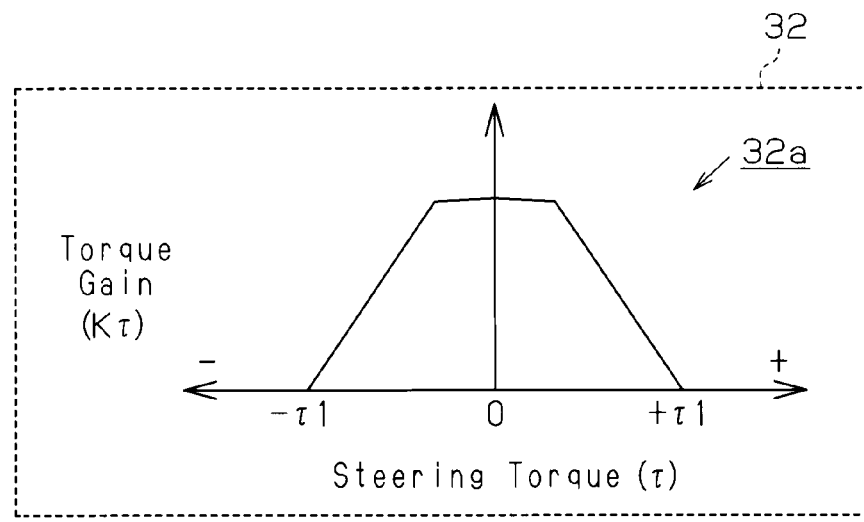
FIG. 5 is a diagram schematically representing a torque gain calculating section of the EPS according to the first embodiment.

As illustrated in FIG. 5, the torque gain calculating section 32 has a map 32a that associates the steering torque τ with the torque gain Kτ. According to the map 32a, if the absolute value of the steering torque τ is smaller than or equal to a predetermined threshold value τ1 (|τ|≦τ1), the torque gain Kτ becomes smaller as the absolute value of the steering torque τ becomes greater. If the absolute value of the steering torque τ exceeds the threshold value τ1 (τ>τ1, τ<−τ1), the torque gain Kτ is set to zero. The threshold value τ1 is set to, for example, a value of the steering torque at which it is assumed that the steering wheel 2 is being intentionally manipulated by the driver. With reference to the map 32a, the torque gain calculating section 32 obtains the torque gain Kτ corresponding to the steering torque τ detected by the torque sensor 14.

Figure 6:
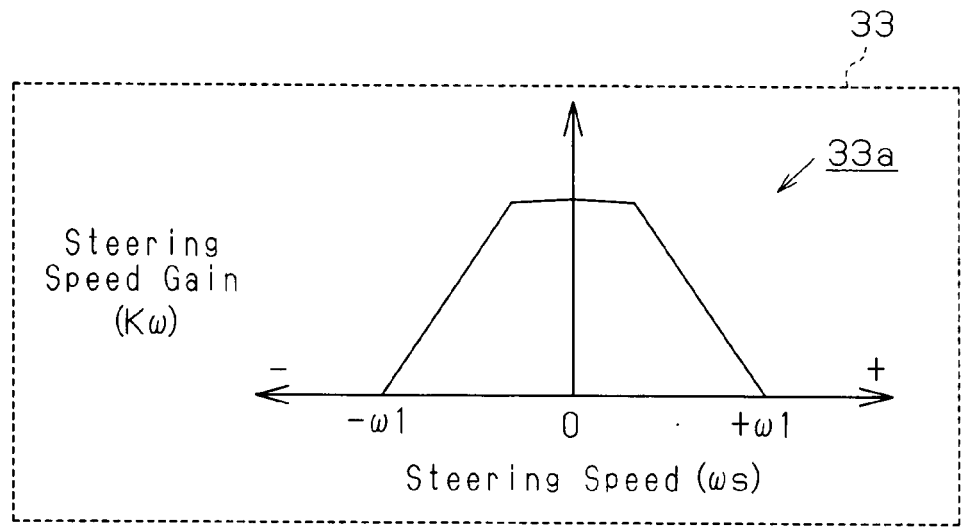
FIG. 6 is a diagram schematically representing a steering speed gain calculating section of the EPS according to the first embodiment.

With reference to FIG. 6, the steering speed gain calculating section 33 has a map 33a that associates the steering speed ωs with the steering speed gain Kω. According to the map 33a, if the absolute value of the steering speed ωs is smaller than or equal to a predetermined threshold value ω1 (|ωs|≧ω1), the steering speed gain Kω becomes smaller as the absolute value of the steering speed ωs becomes greater. If the absolute value of the steering speed ωs exceeds the threshold value ω1 (ωs>ω1, ωs<−ω1), the speed gain Kω is set to zero. The threshold value ω1 is set to, for example, a value of the steering speed at which it is assumed that the steering wheel 2 can be returned to the neutral position due to the inertia, without depending on the steering wheel return compensation control. With reference to the map 33a, the steering speed gain calculating section 33 obtains the steering speed gain Kω corresponding to the steering speed ωs detected by the steering angle sensor 16.

As illustrated in FIG. 3, a multiplier 34 multiplies, by the basic control amount εsb output by the basic control amount calculating section 31, the torque gain Kτ obtained by the torque gain calculating section 32 and the steering speed gain Kω calculated by the steering speed gain calculating section 33. Thus, as (the absolute value of) the steering torque τ becomes greater, or (the absolute value of) the steering speed ωs becomes greater, (the absolute value of) the basic control amount εsb is corrected to a smaller value. If the absolute value of the steering torque τ or the absolute value of the steering speed ωs exceeds the corresponding threshold value (τ1, ω1), the basic control amount εsb is corrected to zero.

A basic control amount εsb', which has been corrected by the multiplier 34, is input to the adder 35. The adder 35 integrates the corrected basic control amount εsb'. Specifically, the adder 35 integrates the corrected basic control amount εsb' by adding the corrected basic control amount εsb' to the integrated value obtained in the previous cycle. The control amount based on the integrated value, or an integrated control amount εINT, is then sent to the adder 29 (see FIG. 2) as a steering wheel return compensation amount Isb*.

After having been obtained by the adder 35, the integrated control amount εINT is input to a guarding section 36. The guarding section 36 executes a guarding procedure in accordance with which (the absolute value of) the integrated control amount ϵINT is limited to a predetermined range. The steering wheel return compensation control section 28 has a previous value maintaining section 37, which maintains a guarded integrated control amount ϵint as a previous integrated control amount ϵint_b. The corrected basic control amount ϵsb' of the current cycle and a previous integrated control amount ϵint_b maintained by the previous value maintaining section 37 are input to the adder 35. The steering wheel return compensation control section 28 calculates the integrated control amount ϵINT of the current cycle by adding the corrected basic control amount ϵsb' to the previous integrated control amount ϵint_b, that is, by adding a value to be integrated of the current cycle to the integrated value obtained in the previous cycle.

The steering wheel return compensation control section 28 includes a vehicle speed gain calculating section 38 and a steering angle gain calculating section 39. The vehicle speed gain calculating section 38 calculates a vehicle speed gain Kv based on the vehicle speed V. The steering angle gain calculating section 39 calculates a steering angle gain Kθ based on the steering angle θs.

Figure 7:
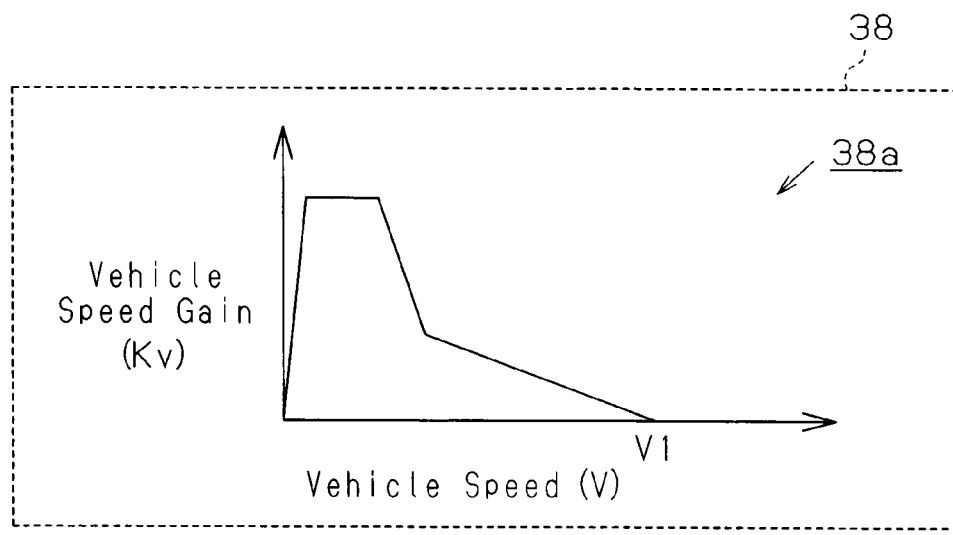
FIG. 7 is a diagram schematically representing a vehicle speed gain calculating section of the EPS according to the first embodiment.

With reference to FIG. 7, the vehicle speed gain calculating section 38 has a map 38*a* that associates the vehicle speed V with the vehicle speed gain Kv. According to the map 38*a*, if the vehicle speed V is smaller than or equal to a predetermined threshold value V1 (V≦V1), the vehicle speed gain Kv becomes smaller as the absolute value of the vehicle speed V becomes greater. If the vehicle speed V exceeds the threshold value V1 (V>V1), the vehicle speed gain Kv is set to zero. The threshold value V1 is set to, for example, a value of the vehicle speed at which it is assumed that self aligning torque is produced to an extent at which the steering wheel 2 can be returned to the neutral position without depending on the steering wheel return compensation control. With reference to the map 38*a*, the vehicle speed gain calculating section 38 obtains the vehicle speed gain Kv corresponding to the vehicle speed V detected by the vehicle speed sensor 15.

Figure 8:
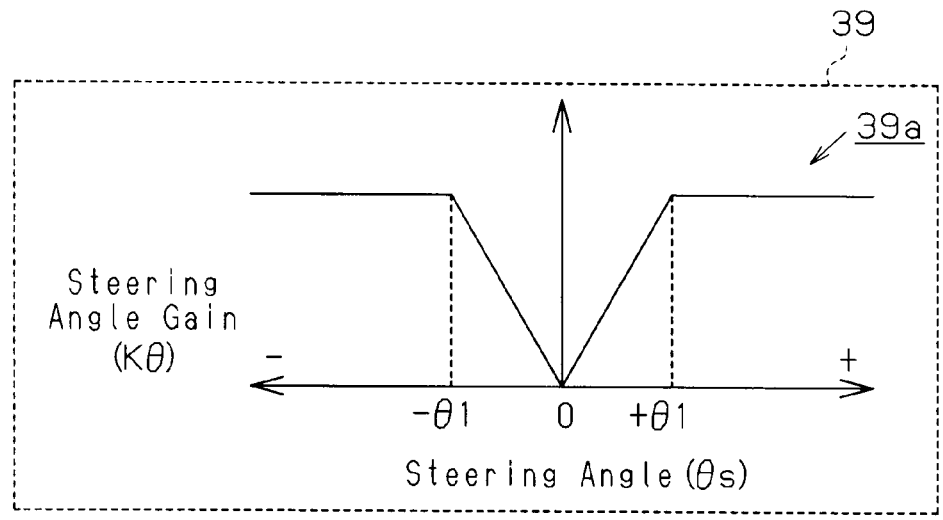
FIG. 8 is a diagram schematically representing a steering angle gain calculating section of the EPS according to the first embodiment.

With reference to FIG. 8, the steering angle gain calculating section 39 has a map 39*a* that associates the steering angle θs with the steering angle gain Kθ. According to the map 39*a*, if the absolute value of the steering angle θs is smaller than or equal to a predetermined threshold value θ1 (|θs|≧θ1), the steering angle gain Kθ becomes smaller as the absolute value of the steering angle θs becomes smaller. If the steering angle θs is zero, the steering angle gain Kθ is set to zero. With reference to the map 39*a*, the steering angle gain calculating section 39 obtains the steering angle gain Kθ corresponding to the steering angle θs detected by the steering angle sensor 16.

As illustrated in FIG. 3, a multiplier 40 multiplies, by the guarded integrated control amount ϵint, which has been determined in the above-described manner, the vehicle speed gain Kv calculated by the vehicle speed gain calculating section 38 and the steering angle gain Kθ obtained by the steering angle gain calculating section 39. Thus, as the vehicle speed V becomes greater, or (the absolute value of) the steering angle θs becomes smaller, (the absolute value of) the integrated control amount ϵint is corrected to a smaller value. If the vehicle speed gain Kv exceeds the threshold value V1, or the steering angle θs is zero, the integrated control amount ϵint is corrected to zero.

The steering wheel return compensation control section 28 includes a neutral position determining section 41 and a clearing section 42. The neutral position determining section 41 determines whether the steering wheel 2 is located in the vicinity of the neutral position (θs=0). The clearing section 42 clears the value of the guarded integrated control amount ϵint, or sets the integrated value to zero, in response to a clearing signal Sc provided by the neutral position determining section 41.

The steering wheel return compensation control section 28 includes a previous value maintaining section 43, which maintains the steering angle θs detected in the previous cycle as a previous steering angle θs_b. The neutral position determining section 41 determines whether the steering wheel 2 is in the vicinity of the neutral position, or performs neutral position determination, in correspondence with the steering angle θs and the previous steering angle θs_b.

Figure 9:
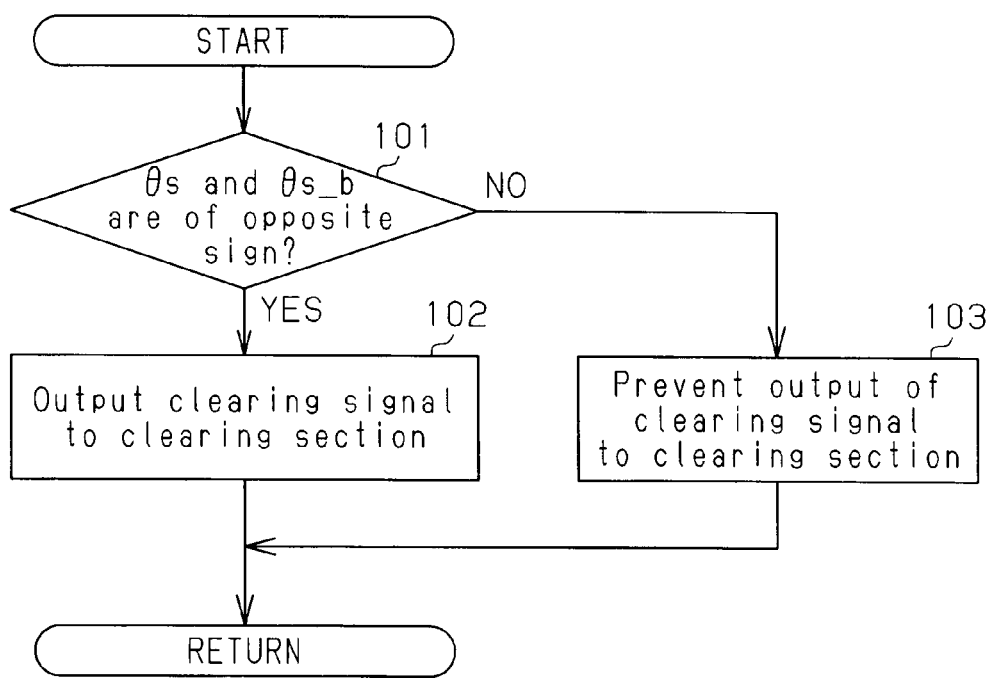
FIG. 9 is a flowchart representing a neutral position determining procedure executed by the EPS according to the first embodiment.

Specifically, as illustrated in FIG. 9, the neutral position determining section 41 determines whether the sign of the steering angle θs is opposite to the sign of the previous steering angle θs_b (step 101). If it is determined that the sign of the steering angle θs and the sign of the previous steering angle θs_b are opposite (step 101: YES), the neutral position determining section 41 determines that the steering wheel 2 is located in the vicinity of the neutral position and outputs the clearing signal Sc to the clearing section 42 (step 102). The clearing section 42 thus clears the value of the integrated control amount ϵint in response to the clearing signal Sc. If it is determined that the sign of the steering angle θs and the sign of the previous steering angle θs_b are not opposite (step 101: NO), the neutral position determining section 41 does not send the clearing signal Sc to the clearing section 42 (step 102). The clearing section 42 therefore does not clear the integrated control amount ϵint.

The steering wheel return compensation control section 28 includes a filtering section 44, which suppresses abrupt change of an output value. The corrected integrated control amount ϵint', which has been obtained by the multiplier 40, is input to the filtering section 44. The filtering section 44 is formed by, for example, a low pass filter (a high cut filter). The steering wheel return compensation control section 28 outputs a filtered integrated control amount ϵint", which is obtained through filtering by the filtering section 44, to the adder 29 (see FIG. 2) as the steering wheel return compensation amount Isb*.

The first embodiment has the following advantages.

(1) The electric current command value calculating section 25 has the steering wheel return compensation control section 28, which calculates the steering wheel return compensation amount Isb* in accordance with which the steering wheel 2 is returned to the neutral position. The steering wheel return compensation control section 28 has the basic control amount calculating section 31, which calculates the basic control amount ϵsb, or the basic component of the steering wheel return compensation amount Isb*. As the absolute value of the steering angle θs detected by the steering angle sensor 16 becomes greater, the absolute value of the basic control amount ϵsb calculated by the basic control amount calculating section 31 becomes greater. The steering wheel return compensation control section 28 integrates the basic control amount ϵsb and outputs the control amount based on the integrated value, or the integrated control amount ϵINT, as the steering wheel return compensation amount Isb*.

In this manner, even when the steering angle θs does not become zero due to insufficient self aligning torque that prevents the steering wheel 2 from returning to the neutral position, the integrated value of the basic control amount ϵsb based on the steering angle θs, or the integrated control amount ϵINT, increases. The (absolute value of the) steering wheel return compensation amount Isb* is thus also increased. This ensures improved returning performance of the steering wheel 2 regardless of the condition of the road surface on which the vehicle is traveling, or, for example, even when the vehicle is traveling on a low μ road that makes it difficult for the vehicle to produce sufficiently great self aligning torque.

(2) The steering wheel return compensation control section 28 has the neutral position determining section 41, which determines whether the steering wheel 2 is in the vicinity of the neutral position, and the clearing section 42, which clears the guarded integrated control amount εint in response to the clearing signal Sc provided by the neutral position determining section 41.

In the integration control performed as described in the item (1), the integrated control amount εINT does not necessarily become zero at the same time as the steering wheel 2 is returned to the neutral position. In this case, the steering wheel return compensation amount Isb* does not become zero after the steering wheel 2 restores its neutral position and the steering angle θs becomes zero. This applies assisting force that acts to rotate the steering wheel 2 excessively beyond the neutral position to the steering system.

However, in the first embodiment, the integrated control amount εINT is cleared if the steering wheel 2 is in the vicinity of the neutral position. As a result, the steering wheel 2 is rapidly returned to the neutral position. This brings about further improved returning performance of the steering wheel 2.

(3) The steering wheel return compensation control section 28 includes the filtering section 44, which suppresses abrupt change of the output value. The steering wheel return compensation control section 28 outputs the filtered integrated control amount εint", which is obtained by the filtering section 44, as the steering wheel return compensation amount Isb*.

When the integrated control amount εINT is cleared due to returning of the steering wheel 2 to the neutral position, as has been described in the item (2), the steering wheel return compensation amount Isb* abruptly changes. This changes the magnitude of the assisting force and thus causes discomfort of the driver.

However, in the first embodiment, such abrupt change of the steering wheel return compensation amount Isb* is suppressed. The extent of the change of the assisting force caused by the change of the steering wheel return compensation amount Isb* is thus lowered. As a result, the returning performance of the steering wheel 2 is improved without decreasing steering comfort.

(4) The steering wheel return compensation control section 28 has the guarding section 36, which limits (the absolute value of) the integrated control amount εINT to the predetermined range. This prevents excessive increase of the steering wheel return compensation amount Isb* caused by excessive increase of the integrated control amount εINT. The improved returning performance of the steering wheel 2 is thus ensured.

(5) The steering wheel return compensation control section 28 has the torque gain calculating section 32, which calculates the torque gain Kτ based on the steering torque τ. According to the map 32a of the torque gain calculating section 32, the torque gain Kτ becomes smaller as the absolute value of the steering torque τ becomes greater if the absolute value of the steering torque τ is smaller than or equal to the predetermined threshold value τ1. Further, if the steering torque τ exceeds the threshold value τ1, the torque gain Kτ is set to zero. The basic control amount εsb generated by the basic control amount calculating section 31 (and the integrated control amount εint) is multiplied by the torque gain Kτ, which is calculated by the torque gain calculating section 32.

In this manner, the steering wheel return compensation amount Isb* is corrected to zero as long as it is assumed that the steering wheel is intentionally manipulated by the driver. This prevents the assisting force produced based on the steering wheel return compensation amount Isb* from hampering manipulation of the steering wheel 2 by the driver. As a result, the returning performance of the steering wheel 2 is improved without decreasing the steering comfort. Further, even if the steering torque τ is smaller than or equal to the predetermined threshold value τ1, improved steering comfort is brought about by reducing the steering wheel return compensation amount Isb* in correspondence with increase of the steering torque τ.

(6) The steering wheel return compensation control section 28 includes the steering speed gain calculating section 33, which calculates the steering speed gain Kω based on the steering speed ωs. According to the map 33a of the steering speed gain calculating section 33, if the absolute value of the steering speed ωs is smaller than or equal to the predetermined threshold value ω1, the steering speed gain Kω becomes smaller as the absolute value of the steering speed ωs becomes greater. If the absolute value of the steering speed ωs exceeds the threshold value ω1, the steering speed gain KG) is set to zero. The basic control amount εsb output by the basic control amount calculating section 31 is multiplied by the steering speed gain Kω, which is obtained by the steering speed gain calculating section 33.

If the steering wheel 2 is rotated toward the neutral position with a sufficiently great steering speed ωs, the steering wheel 2 is returned to the neutral position due to inertia without depending on the steering wheel return compensation control. Thus, if the steering wheel return compensation control is carried out in such a case, the steering wheel 2 may rotate excessively beyond the neutral position. The steering wheel 2 is thus prevented from quickly restoring its neutral position. Further, if the steering wheel 2 is manipulated to rotate in a direction in which (the absolute value of) the steering angle θs increases, the assisting force produced based on the steering wheel return compensation amount Isb* may hamper manipulation of the steering wheel 2.

However, in the first embodiment, the steering wheel return compensation amount Isb* is corrected to zero if the steering speed ωs is sufficiently great. This prevents excessive rotation of the steering wheel 2 caused by the assisting force produced based on the steering wheel return compensation amount Isb*. The assisting force thus does not hamper the driver's manipulation of the steering wheel 2. As a result, the returning performance of the steering wheel 2 is improved without decreasing the steering comfort. Further, if the steering speed ωs is smaller than or equal to the predetermined threshold value ω1, improved steering comfort is ensured by decreasing the steering wheel return compensation amount Isb* as the steering speed ωs increases.

(7) The steering wheel return compensation control section 28 includes a vehicle speed gain calculating section 38, which calculates the vehicle speed gain Kv based on the vehicle speed V. According to the map 38a of the vehicle speed gain calculating section 38, if the vehicle speed V is smaller than or equal to the predetermined threshold value V1, the vehicle speed gain Kv becomes smaller as the absolute value of the vehicle speed V becomes greater. If the vehicle speed V exceeds the threshold value V1, the vehicle speed gain Kv is set to zero. The integrated control amount εint is multiplied by the vehicle speed gain Kv, which is calculated by the vehicle speed gain calculating section 38.

The self aligning torque becomes greater as the vehicle speed V becomes greater. If the vehicle speed V is sufficiently great, sufficiently great self aligning torque is produced to return the steering wheel 2 to the neutral position, regardless of the condition of the road surface on which the vehicle runs. If the steering wheel return compensation control is performed in this case, the steering wheel 2 may be rotated excessively beyond the neutral position. This prevents the steering wheel 2 from quickly restoring its neutral position. Further, if the steering wheel 2 is manipulated to rotate in a direction in which (the absolute value of) the steering angle θs increases, the assisting force generated based on the steering wheel return compensation amount Isb* may hamper such manipulation of the steering wheel 2.

However, in the first embodiment, the steering wheel return compensation amount Isb* is corrected to zero when the vehicle speed V is sufficiently great. This prevents the steering wheel 2 from being excessively rotated by the assisting force produced based on the steering wheel return compensation amount Isb*. The assisting force is thus prevented from hampering the driver's manipulation of the steering wheel 2. As a result, the returning performance of the steering wheel 2 is enhanced without decreasing the steering comfort. Further, if the vehicle speed V is smaller than or equal to the predetermined threshold value V1, improved steering comfort is brought about by decreasing the steering wheel return compensation amount Isb* as the vehicle speed V increases.

(8) The steering wheel return compensation control section 28 includes the steering angle gain calculating section 39, which calculates the steering angle gain Kθ in correspondence with the steering angle θs. According to the map 39a of the steering angle gain calculating section 39, if the absolute value of the steering angle θs is smaller than or equal to the predetermined threshold value θ1, the steering angle gain Kθ becomes smaller as the absolute value of the steering angle θs becomes smaller. If the steering angle θs is zero, the steering angle gain Kθ is set to zero. The integrated control amount εint is multiplied by the steering angle gain Kθ, which is calculated by the steering angle gain calculating section 39.

In the first embodiment, the steering wheel return compensation amount Isb* is decreased if the steering wheel 2 is in the vicinity of the neutral position. This prevents excessive rotation of the steering wheel 2 caused by the assisting force produced base on the steering wheel return compensation amount Isb*. The returning performance of the steering wheel 2 is thus further improved.

Second Embodiment

A second embodiment of the present invention will hereafter be explained with reference to FIGS. 10 to 12.

The second embodiment differs from the first embodiment mainly in how the steering wheel return compensation control is carried out. To facilitate understanding, same or like reference numerals are given to components of the second embodiment that are the same as or like corresponding components of the first embodiment. Detailed explanation thereof will thus be omitted.

Figure 10:
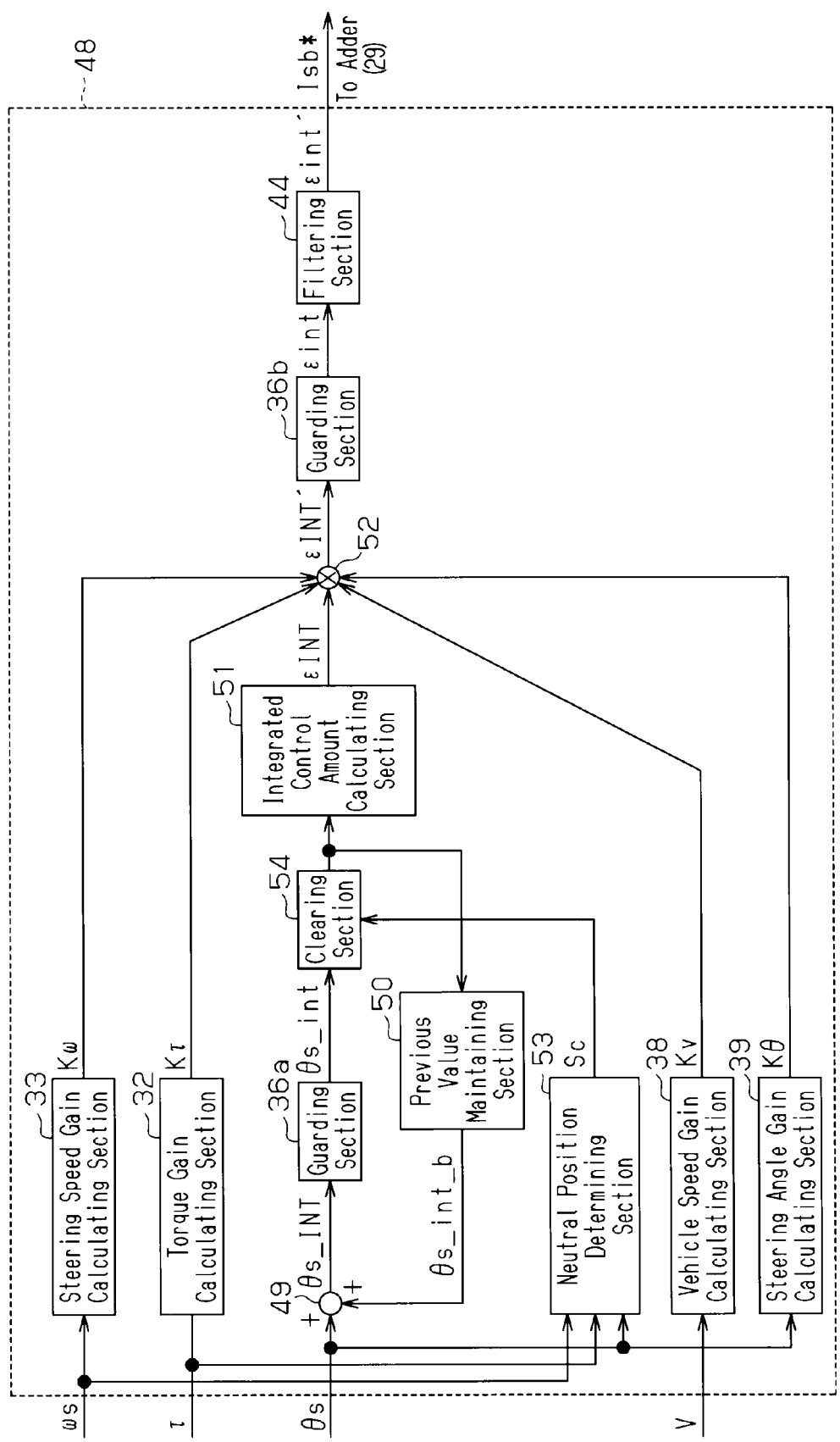
FIG. 10 is a block diagram representing control of a steering wheel return compensation control section of an EPS according to a second embodiment of the present invention.

As illustrated in FIG. 10, a steering wheel return compensation control section 48 of the EPS 1 according to the second embodiment integrates the steering angle θs detected by the steering angle sensor 16 and calculates the integrated control amount εINT based on the integrated value, which is an integrated steering angle θs_INT (θs_int). The steering wheel return compensation control section 48 outputs a control amount based on the thus obtained integrated control amount εINT to the adder 29 (see FIG. 2) as the steering wheel return compensation amount Isb*.

Specifically, the steering angle θs, which is detected by the steering angle sensor 16, is input to an adder 49 of the steering wheel return compensation control section 48. The steering wheel return compensation control section 48 integrates the steering angle θs by adding the steering angle θs detected in the current cycle to the integrated value obtained in the previous cycle at the adder 49. The integrated steering angle θs_INT, which is calculated by the adder 49, is input to a guarding section 36a. The guarding section 36a performs a guarding procedure in such a manner as to limit (the absolute value of) the integrated steering angle θs_INT to a predetermined range. The steering wheel return compensation control section 48 includes a previous value maintaining section 50, which maintains a guarded integrated steering angle θs_int as a previous integrated steering angle θs_int_b. The adder 49 receives the steering angle θs of the current cycle and the previous integrated steering angle θs_int_b, which is maintained by the previous value maintaining section 50. The steering wheel return compensation control section 48 calculates the integrated steering angle θs_INT of the current cycle by adding the steering angle θs to the previous integrated steering angle θs_int_b, that is, by adding a value to be integrated of the current cycle to the integrated value obtained in the previous cycle.

The thus obtained integrated steering angle θs_INT is input to an integrated control amount calculating section 51 as the guarded integrated steering angle θs_int. The integrated control amount calculating section 51 calculates the integrated control amount εINT, or a basic component of the steering wheel return compensation amount Isb*, based on the guarded integrated steering angle θs_int.

Figure 11:
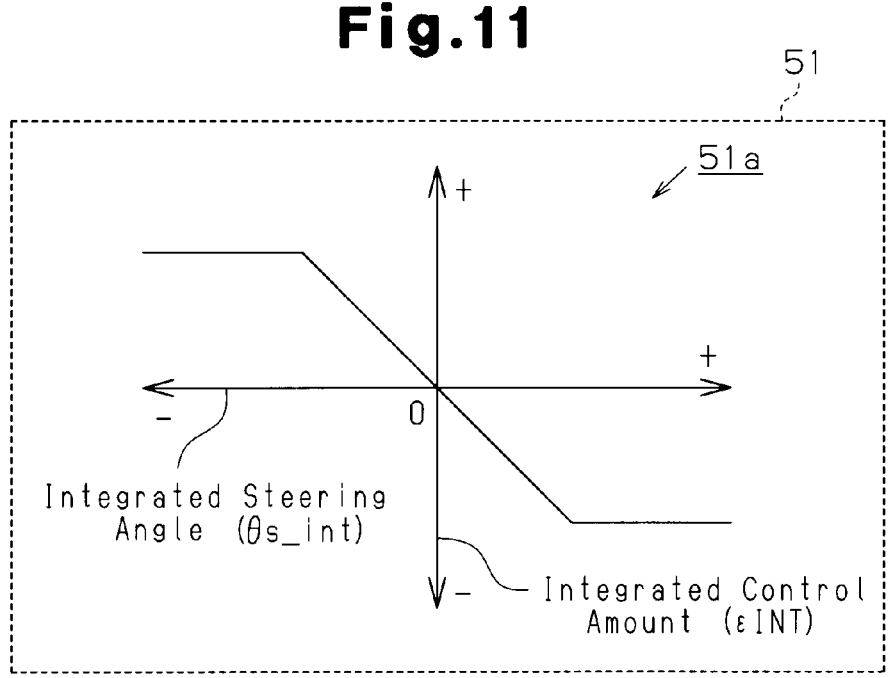
FIG. 11 is a diagram schematically representing an integrated control amount calculating section of the EPS according to the second embodiment.

As illustrated in FIG. 11, the integrated control amount calculating section 51 has a map 51a that associates the integrated steering angle θs_int with the integrated control amount εINT. With reference to the map 51a, the integrated control amount calculating section 51 calculates the integrated control amount εINT corresponding to the integrated steering angle θs_int input to the integrated control amount calculating section 51.

The integrated control amount εINT obtained by the integrated control amount calculating section 51 has a property to rotate the steering wheel 2 in a direction of a sign opposite to the direction of the sign of the integrated steering angle θs_int, which is input to the integrated control amount calculating section 51. In other words, if the direction the sign of the integrated steering angle θs_int is positive, the integrated control amount εINT has a property to rotate the steering wheel 2 in the negative direction. If the direction of the sign of the integrated steering angle θs_int is negative, the integrated control amount εINT has a property to rotate the steering wheel 2 in the positive direction. As the absolute value of the integrated steering angle θs_int becomes greater, the absolute value of the integrated control amount εINT, which is calculated by the integrated control amount calculating section 51, becomes greater so that the steering wheel 2 is rotated toward the neutral position by a greater amount. In other words, the integrated control amount calculating section 51 calculates the integrated control amount εINT in such a manner that, in accordance with the integrated control amount εINT, the amount of rotation of the steering wheel 2 to the neutral position becomes greater as the absolute value of the integrated steering angle θs_int becomes greater.

The thus obtained integrated control amount εINT is input to a multiplier 52. The multiplier 52 multiplies the integrated control amount εINT by the same gains as those of the first embodiment, which are the torque gain Kτ, the steering speed gain Kω, the vehicle speed gain Kv, and the steering angle gain Kθ (see FIGS. 5 to 8). An integrated control amount εINT' obtained by such multiplication is then input to a guarding section 36b. The guarding section 36b performs a guarding procedure in accordance with which the integrated control amount εINT' is limited to a predetermined range. A guarded integrated control amount εint, which has been subjected to the guarding procedure by the guarding section 36b, is sent to a filtering section 44. The filtering section 44 carries out a filtering procedure on the guarded integrated control amount εint. The steering wheel return compensation control section 48 then outputs a filtered integrated control amount εint' to the adder 29 (see FIG. 2) as a steering wheel return compensation amount Isb*.

The steering wheel return compensation control section 48 has a neutral position determining section 53 and a clearing section 54. The neutral position determining section 53 determines whether the steering wheel 2 is in the vicinity of the neutral position (θs=0). The clearing section 54 clears the guarded integrated steering angle θs_int, or sets the integrated value to zero, in response to a clearing signal Sc provided by the neutral position determining section 53. The neutral position determining section 53 determines whether the steering wheel 2 is in the vicinity of the neutral position, or carries out a neutral position determining procedure, based on the steering torque τ, the steering angle θs, and the steering speed ωs, which are detected by the torque sensor 14 and the steering angle sensor 16.

Figure 12:
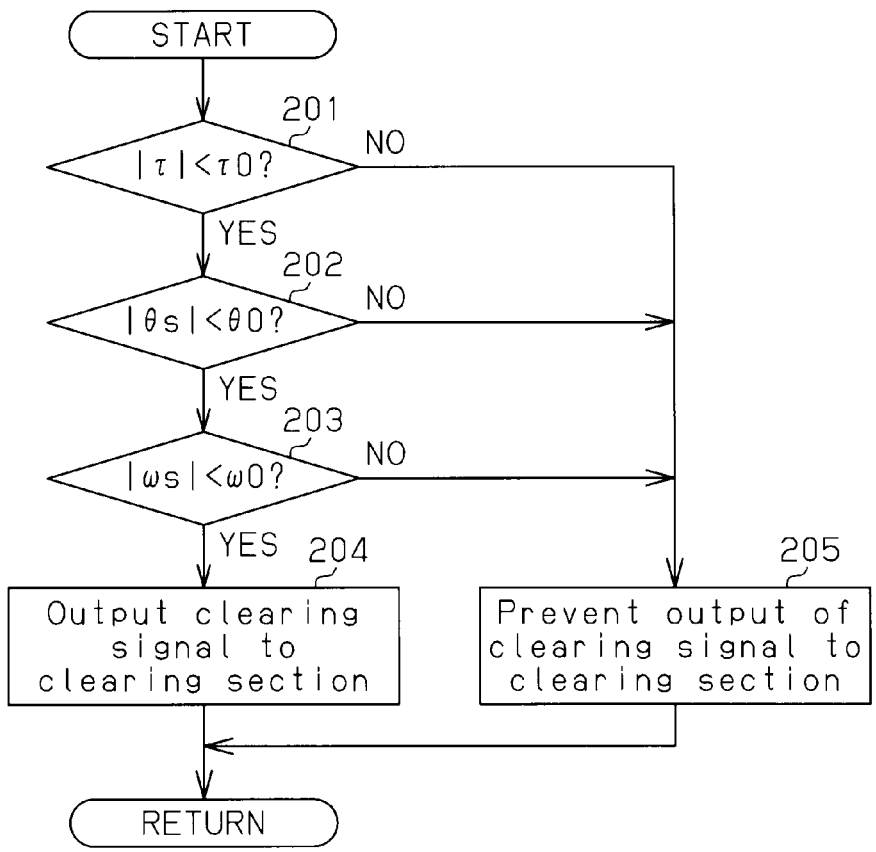
FIG. 12 is a flowchart representing a neutral position determining procedure carried out by the EPS according to the second embodiment.

Specifically, as illustrated in FIG. 12, the neutral position determining section 53 determines whether the absolute value of the steering torque τ is smaller than a predetermined threshold value τ (step 201), whether the absolute value of the steering angle θs is smaller than a predetermined threshold value θ0 (step 202), and whether the absolute value of the steering speed ωs is smaller than a predetermined threshold value ω0 (step 203). If it is determined that the absolute value of the steering torque τ is smaller than the threshold value τ0 (|τ|<τ0, step 201: YES), that the absolute value of the steering angle θs is smaller than the threshold value θ0 (|θs|<θ0, step 202: YES), and that the absolute value of the steering speed ωs is smaller than the threshold value ω0 (|ωs|<ω0, step 203: YES), the neutral position determining section 53 determines that the steering wheel 2 is in the vicinity of the neutral position and sends the clearing signal Sc to the clearing section 54 (step 204). The clearing section 54 clears the integrated steering angle θs_int in response to the clearing signal Sc. Contrastingly, if it is determined that the absolute value of the steering torque τ is greater than or equal to the threshold value τ0 (|τ|≧τ0, step 201: NO), that the absolute value of the steering angle θs is greater than or equal to the threshold value θ0 (|θs|≧θ0, step 202: NO), or that the absolute value of the steering speed ωs is greater than or equal to the threshold value ω0 (|ωs|≧ω0, step 203: NO), the neutral position determining section 53 does not provide the clearing signal Sc to the clearing section 54 (step 205). The clearing section 54 therefore does not clear the integrated steering angle θs_int.

The second embodiment has the advantages equivalent with the advantages of the first embodiment.

Third Embodiment

A third embodiment of the present invention will hereafter be explained with reference to FIGS. 13 to 16.

The third embodiment differs from the first embodiment mainly in how the steering wheel return compensation control is carried out. To facilitate understanding, same or like reference numerals are given to components of the third embodiment that are the same as or like corresponding components of the first embodiment. Detailed explanation thereof will thus be omitted.

Figure 13:
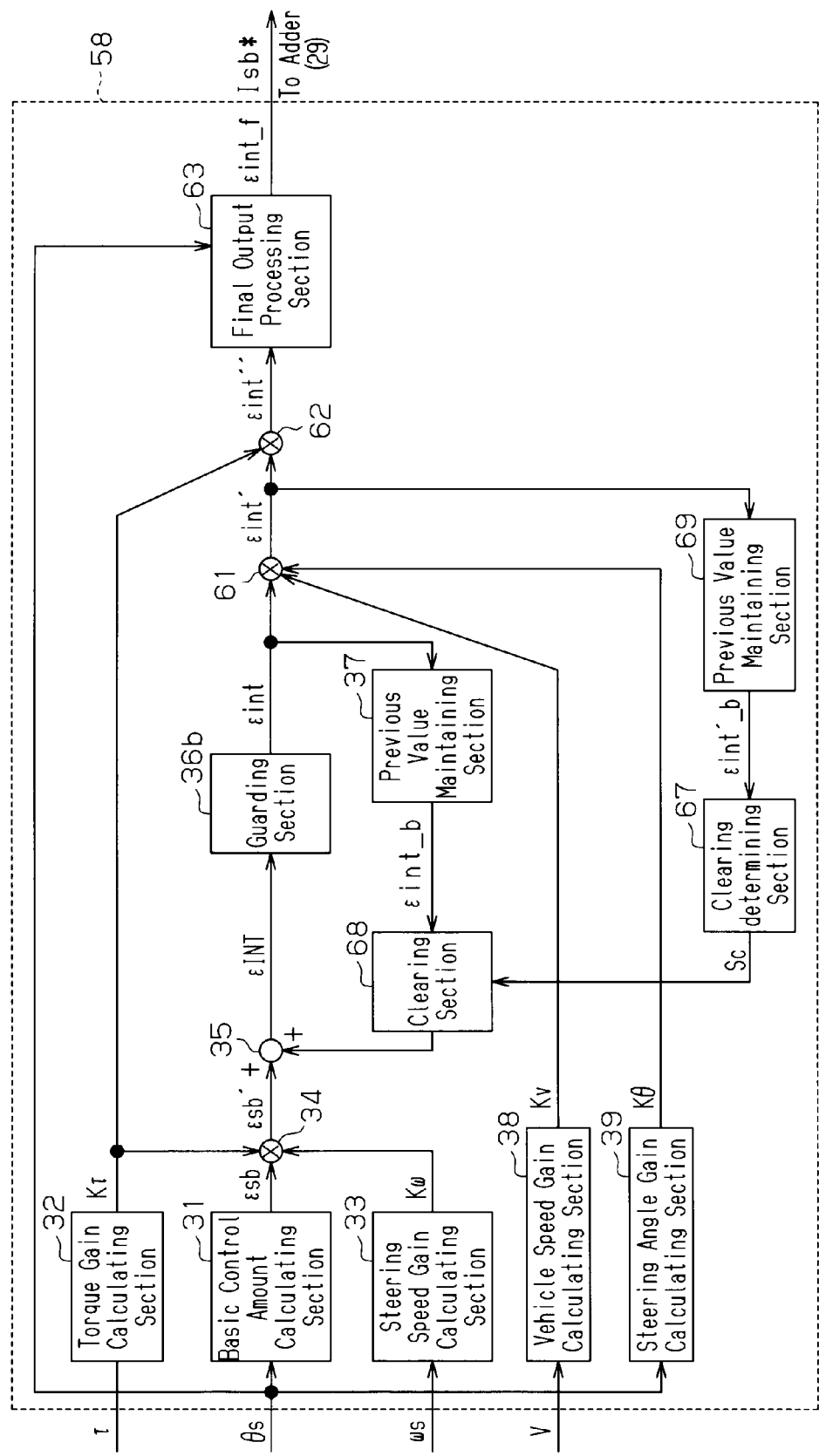
FIG. 13 is a block diagram representing control of a steering wheel return compensation control section of an EPS according to a third embodiment of the present invention.

With reference to FIG. 13, according to a steering wheel return compensation control section 58 of the EPS 1 according to the third embodiment, a guarded integrated control amount εint that has been subjected to a guarding procedure by a guarding section 36b is first input to a multiplier 61. The multiplier 61 multiples the guarded integrated control amount εint by the vehicle speed gain Kv and the steering angle gain Kθ (see FIGS. 7 and 8). The multiplied value, or a multiplied integrated control amount εint' is input to a multiplier 62. The multiplier 62 multiplies the multiplied integrated control amount εint' by the torque gain Kτ (see FIG. 5).

The steering wheel return compensation control section 58 includes a final output processing section 63, instead of the filtering section 44 of the first embodiment. An integrated control amount εint", which is obtained by multiplying the integrated control amount εint' by the torque gain Kτ, is input to the final output processing section 63. The final output processing section 63 performs a final output processing procedure on the integrated control amount εint", obtaining an integrated control amount εint_f. The steering wheel return compensation control section 58 outputs the integrated control amount εint_f to the adder 29 (see FIG. 2) as the steering wheel return compensation amount Isb*.

Figure 14:
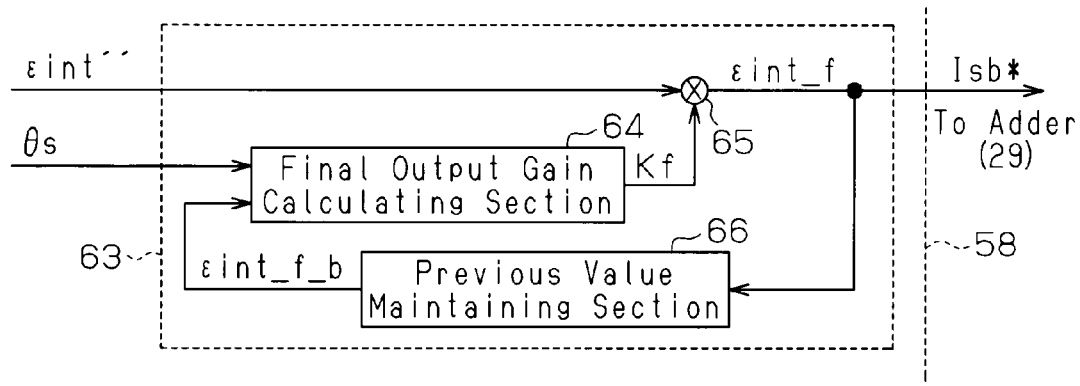
FIG. 14 is a diagram schematically representing a final output processing section of the EPS according to the third embodiment.

Specifically, as illustrated in FIG. 14, the final output processing section 63 includes a final output gain calculating section 64, which outputs a final output gain Kf in accordance with which excessive rotation of the steering wheel 2 beyond its neutral position is suppressed. The integrated control amount εint", which is sent to the final output processing section 63, is input to a multiplier 65 together with the final output gain Kf. The final output processing section 63 multiplies the integrated control amount εint" by the final output gain Kf at the multiplier 65. In this manner, the final output processing procedure is accomplished and an integrated control amount εint_f is obtained.

More specifically, the final output processing section 63 includes a previous value maintaining section 66, which maintains the integrated control amount εint_f that has been subjected to the final output processing procedure in the previous cycle as a previous integrated control amount εint_f_b. The previous integrated control amount εint_f_b and the steering angle θs are input to the final output gain calculating section 64. Based on the previous integrated control amount εint_f_b and the steering angle θs, the final output gain calculating section 64 calculates the final output gain Kf, which is to be output to the multiplier 65.

Figure 15:
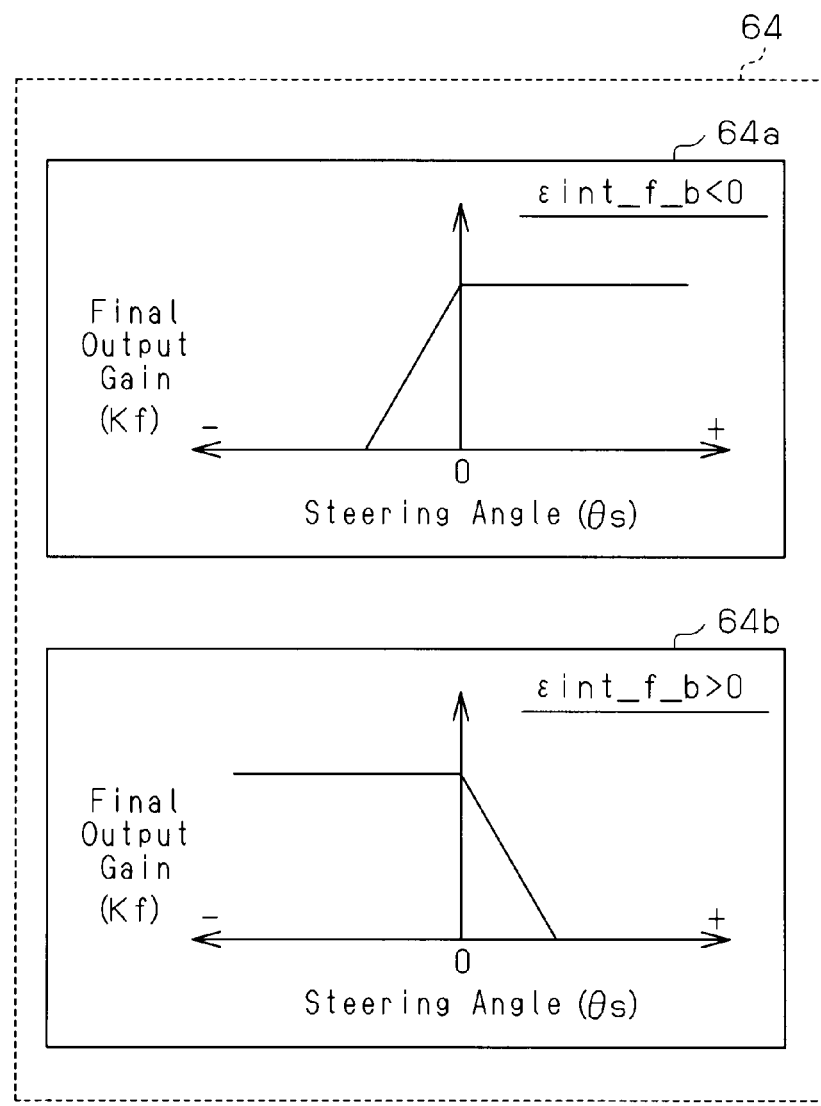
FIG. 15 is a diagram schematically representing a final output gain calculating section of the EPS according to the third embodiment.

In other words, with reference to FIG. 15, the final output gain calculating section 64 has a first map 64a and a second map 64b, which associate the final output gain Kf with the steering angle θs. According to the first map 64a, if the sign of the steering angle θs is negative (θs<0), the final output gain Kf becomes smaller as the absolute value of the steering angle θs becomes greater, or the steering angle θs becomes a greater negative value. In contrast, according to the second map 64b, if the sign of the steering angle θs is positive (θs>0), the final output gain Kf becomes smaller as the absolute value of the steering angle θs becomes greater, or the steering angle θs becomes a greater positive value. According to the first map 64a, the final output gain Kf is set to a constant, which is, for example, one, if the steering angle θs is greater than or equal to zero (θs>0). According to the second map 64b, the final output gain Kf is set to a constant, which is, for example, one, if the steering angle θs is smaller than or equal to zero (θs≦0). To calculate the final output gain Kf, the final output gain calculating section 64 refers to the first map 64a if the sign of the previous integrated control amount ∈int_f_b is negative (∈int_f_b<0) and refers to the second map 64b if the sign of the previous integrated control amount ∈int_f_b is positive (∈int_f_b>0).

The integrated control amount ∈INT, which is calculated by integrating the basic control amount ∈sb based on the steering angle θs, does not necessarily become zero at the same time as the steering wheel 2 is returned to the neutral position. The integrated control amount ∈int_f that has been output as the steering wheel return compensation amount Isb* in the previous cycle, or the previous integrated control amount ∈int_f_b, and the steering angle θs detected in the current cycle are of same sign, the integrated control amount ∈int″ input to the final output gain calculating section 64 in the current cycle is highly likely to increase the absolute value of the steering angle θs. If such integrated control amount ∈int″ is output as the steering wheel return compensation amount Isb* without being corrected, the steering wheel 2 may be rotated excessively beyond the neutral position and prevented from being quickly returned to the neutral position.

To avoid this, as has been described, the final output gain calculating section 64 selectively uses the two maps 64a, 64b, which have different characteristics, depending on the sign of the previous integrated control amount ∈int_f_b. Thus, when the sign of the previous integrated control amount ∈int_f_b and the sign of the steering angle θs detected in the current cycle are the same, the final output gain Kf, which is calculated by the final output gain calculating section 64, becomes smaller as the absolute value of the steering angle θs becomes greater. The absolute value of the integrated control amount ∈int_f, or the absolute value of the steering wheel return compensation amount Isb*, thus becomes smaller. This suppresses excessive rotation of the steering wheel 2 beyond the neutral position, allowing the steering wheel 2 to quickly return to the neutral position.

With reference to FIG. 13, the steering wheel return compensation control section 58 has a clearing determining section 67 corresponding to the neutral position determining section 41 according to the first embodiment. The steering wheel return compensation control section 58 also has a clearing section 68, which is arranged between the previous value maintaining section 37 and the adder 35. The clearing section 68 clears the previous integrated control amount ∈int_b, which is output by the previous value maintaining section 37, or sets the previous integrated control amount ∈int_b to zero, in response to the clearing signal Sc provided by the clearing determining section 67.

The steering wheel return compensation control section 58 includes a previous value maintaining section 69. The previous value maintaining section 69 maintains the integrated control amount ∈int′ calculated in the previous cycle, which is obtained by multiplying the integrated control amount ∈int by the vehicle speed gain Kv and the steering angle gain Kθ, as the previous integrated control amount ∈int′_b. The clearing determining section 67 determines whether the previous integrated control amount ∈int_b should be cleared based on the previous integrated control amount ∈int′_b.

Specifically, with reference to FIG. 16, the clearing determining section 67 first determines whether the previous integrated control amount ∈int′_b, which has been input to the clearing determining section 67, is zero (step 301). If it is determined that the previous integrated control amount ∈int′_b is zero (step 301: YES), the clearing determining section 67 outputs the clearing signal Sc to the clearing section 68 (step 302). In response to the clearing signal Sc, the clearing section 68 clears the previous integrated control amount ∈int_b. In contrast, if it is not determined that the previous integrated control amount ∈int′_b is zero (step 301: NO), the clearing determining section 67 does not output the clearing signal Sc to the clearing section 68 (step 302). The clearing section 68 therefore does not clear the previous integrated control amount ∈int_b.

The integrated control amount ∈int′, which is obtained by multiplying the integrated control amount ∈int by the vehicle speed gain Kv and the steering angle gain Kθ, becomes zero if the vehicle speed V exceeds the predetermined threshold value V1 (see FIG. 7) or if the steering angle θs is zero (see FIG. 8). As has been described, if the steering wheel return compensation control is performed with the vehicle speed V exceeding the threshold value V1, the steering wheel 2 may be rotated excessively beyond the neutral position or manipulation of the steering wheel 2 by the driver may be hampered. Further, since the integrated control amount ∈INT (∈int) does not necessarily become zero when the steering angle θs is zero, the steering wheel 2 is rotated excessively in correspondence with the previous integrated control amount ∈int_b, which is the base of integration of the integrated control amount ∈INT.

To solve this problem, in the third embodiment, the previous integrated control amount ∈int_b is cleared if the vehicle speed V exceeds the threshold value V1 or if the steering angle θs is zero. Since integration control is not performed in these cases, the above-described problem is prevented from occurring.

The third embodiment has the following advantages in addition to the advantages equivalent to those of the first embodiment.

(1) The steering wheel return compensation control section 58 outputs the integrated control amount ∈int_f, which is provided by the final output processing section 63, as the steering wheel return compensation amount Isb*. The final output processing section 63 calculates the integrated control amount ∈int_f by multiplying the integrated control amount ∈int″ by the final output gain Kf output from the final output gain calculating section 64. In such calculation, if the sign of the previous integrated control amount ∈int_f_b and the sign of the steering angle θs detected in the current cycle are the same, the final output gain calculating section 64 outputs a smaller final output gain Kf as the absolute value of the steering angle θs becomes greater.

In this manner, even if the steering wheel return compensation amount Isb* has a property for increasing the absolute value of the steering angle θs, the steering wheel return compensation amount Isb* is reduced. This prevents the steering wheel 2 from rotating excessively beyond its neutral position. The steering wheel 2 thus quickly returns to the neutral position. Further, since the steering wheel return compensation amount Isb* is prevented from abruptly changing at this stage, the returning performance of the steering wheel 2 is enhanced without degrading the steering comfort.

(2) When the steering angle θs is zero, the steering wheel return compensation control section 58 clears the integrated control amount ∈int obtained in the previous cycle, or the previous integrated control amount ∈int_b. In other words, the integration control is not performed in this case, thus preventing the steering wheel 2 from rotating excessively beyond the neutral position in correspondence with the previous integrated control amount ∈int_b. This allows the steering wheel 2 to quickly return to the neutral position.

(3) If (the absolute value of) the vehicle speed V exceeds the predetermined threshold value V1, the steering wheel return compensation control section 58 clears the integrated control amount ∈int calculated in the previous cycle, or the previous integrated control amount ∈int_b. That is, the integration control is not carried out in this case. Thus, excessive rotation of the steering wheel 2 beyond its neutral position or hampering of the driver's manipulation of the steering wheel 2, which are caused by unnecessary steering wheel return compensation control, are avoided. This improves the returning performance of the steering wheel 2 without degrading the steering comfort.

The first to third embodiments may be modified as follows.

In the first to third embodiments, the steering wheel return compensation control sections 28, 48, 58 each include the torque gain calculating section 32, the steering speed gain calculating section 33, the vehicle speed gain calculating section 38, and the steering angle gain calculating section 39. However, the steering wheel return compensation control section 28, 48, 58 does not necessarily have to have all these sections, and a certain one (certain ones) of the gain calculating sections may be omitted as needed.

In the first to third embodiments, the guarding sections 36, 36a, 36b each operate to limit (the absolute value of) the integrated value, which is the control amount obtained precedently to the steering wheel return compensation amount Isb*, to the predetermined range. However, the guarding section 36, 36a, 36b may operate to limit the steering wheel return compensation amount Isb* to a predetermined range.

In the first embodiment, the neutral position determination is performed in correspondence with the steering angle θs of the current cycle and the steering angle θs_b of the previous cycle. In the second embodiment, the neutral position determination is carried out in correspondence with the steering torque τ, the steering angle θs, and the steering speed ωs. However, the neutral position determination is not restricted to these manners but may be performed in a manner modified as needed.

In the third embodiment, the steering wheel return compensation control section 58 includes the final output processing section 63 instead of the filtering section 44. However, the steering wheel return compensation control section 58 may have both of the filtering section 44 and the final output processing section 63.

In the third embodiment, the basic control amount ∈sb is calculated based on the steering angle θs and the control amount obtained based on the integrated value of the basic control amount ∈sb is output as the steering wheel return compensation amount Isb*, as in the first embodiment. However, the steering wheel return compensation control section 58 may be constituted in a different manner such that the control amount calculated based on the integrated value of the steering angle θs is output as the steering wheel return compensation amount Isb*.

Selection may be made between the clearing procedure performed on the integrated value as illustrated in the first and second embodiments and the clearing procedure carried out on the value from the previous cycle as illustrated in the third embodiment.

In the first to third embodiments, the determinations with reference to the threshold values (comparison with respect to the threshold values τ1, V1, θ1, and ω1) are carried out with reference to the maps 32a, 33a, 38a, 39a. However, such determinations do not necessarily have to be performed using maps.

The invention claimed is:

1. An electric power steering apparatus of a vehicle, the apparatus comprising:
a steering force assisting section that applies an assisting force to a steering system of the vehicle to assist manipulation of a steering wheel, the steering force assisting section including a motor as a driving source; and
a control section that calculates a target value of the assisting force applied to the steering system, the control section calculating the target value by superimposing on a basic assist component a steering wheel return compensation component in accordance with which the steering wheel is returned to a neutral position, the control section controlling operation of the steering force assisting section by supplying a driving power to the motor in such a manner that the assisting force matching the target value is applied to the steering system,
wherein the steering wheel return compensation component is repeatedly calculated by the control section based on a basic control amount of the steering wheel return compensation computed by the control section in such a manner that the basic control amount has a property to rotate the steering wheel with a specific steering angle by a greater amount to the neutral position as the absolute value of the steering angle becomes greater, and
wherein the control section calculates the steering wheel return compensation component by integrating the basic control amount with at least one previously calculated basic control amount previously computed by the control section.

2. The apparatus according to claim 1, wherein the control section determines whether the steering wheel is in the vicinity of the neutral position, and clears the integrated value if it is determined that the steering wheel is in the vicinity of the neutral position.

3. The apparatus according to claim 1, wherein the control section performs a filtering procedure to suppress abrupt change of the steering wheel return compensation component.

4. The apparatus according to claim 1, wherein the control section calculates the steering wheel return compensation component at predetermined cycles, and wherein, in calculation of the steering wheel return compensation component of each of the cycles, the control section obtains the integrated value of a current cycle by adding a value to be integrated of the current cycle to the integrated value obtained in the previous cycle, and wherein, if the value of the steering wheel return compensation component of the previous cycle has a property to increase the absolute value of the steering angle of the current cycle, the control section sets the absolute value of the steering wheel return compensation component calculated in the current cycle to a smaller value as the absolute value of the steering angle becomes greater.

5. The apparatus according to claim 1, wherein the control section calculates the steering wheel return compensation component at predetermined cycles, and wherein, in calculation of the steering wheel return compensation component of each of the cycles, the control section obtains the integrated value of a current cycle by adding a value to be integrated of the current cycle to the integrated value obtained in the previous cycle, and wherein, if the steering angle of the steering wheel of the current cycle is zero, the control section clears the integrated value of the previous cycle.

6. The apparatus according to claim 1, wherein the control section calculates the steering wheel return compensation component at predetermined cycles, and wherein, in calculation of the steering wheel return compensation component of each of the cycles, the control section obtains the integrated value of a current cycle by adding a value to be integrated of the current cycle to the integrated value obtained in the previous cycle, and wherein, if the absolute value of a vehicle speed of the current cycle exceeds a predetermined threshold value, the control section clears the integrated value of the previous cycle.

7. The apparatus according to claim 1, wherein the control section performs a guarding procedure by which the integrated value of the basic control amount is limited to a predetermined range of basic control amounts.

8. The apparatus according to claim 1, wherein the control section performs a guarding procedure by which the value of the steering wheel return compensation component is limited to a predetermined range.

9. The apparatus according to claim 1, wherein the control section corrects the value of the steering wheel return compensation component to zero if the absolute value of a steering torque exceeds a predetermined steering torque threshold value.

10. The apparatus according to claim 9, wherein, if the absolute value of the steering torque is smaller than or equal to the predetermined steering torque threshold value, the absolute value of the steering wheel return compensation component calculated by the control section becomes smaller as the absolute value of the steering torque becomes greater.

11. The apparatus according to claim 1, wherein, if the absolute value of a steering speed exceeds a predetermined steering speed threshold value, the control section corrects the value of the steering wheel return compensation component to zero.

12. The apparatus according to claim 11, wherein, if the absolute value of the steering speed is smaller than or equal to the predetermined steering speed threshold value, the absolute value of the steering wheel return compensation component calculated by the control section becomes smaller as the absolute value of the steering speed becomes greater.

13. The apparatus according to claim 1, wherein, if a vehicle speed exceeds a predetermined vehicle speed threshold value, the control section corrects the value of the steering wheel return compensation component to zero.

14. The apparatus according to claim 13, wherein, if the vehicle speed is smaller than or equal to the predetermined vehicle speed threshold value, the absolute value of the steering wheel return compensation component calculated by the control section becomes smaller as the vehicle speed becomes greater.

15. The apparatus according to claim 1, wherein, if the absolute value of the steering angle is smaller than or equal to a predetermined threshold value, the absolute value of the steering wheel return compensation component calculated by the control section becomes smaller as the absolute value of the steering angle becomes smaller.

* * * * *